United States Patent Office 3,565,915
Patented Feb. 23, 1971

3,565,915

PROCESS FOR PRODUCING AN OPTICALLY ACTIVE DIHYDROCHRYSANTHEMOLACTONE

Masanao Matsui, Tokyo, Hirosuke Yoshioka, Nishinomiya-shi, Hideo Sakamoto, Saitama-ken, and Yasuhiro Yamada, Tokyo, Japan, assignors to Sumitomo Chemical Company, Ltd., Osaka, Japan, a corporation of Japan No Drawing. Filed May 24, 1966, Ser. No. 552,443
Claims priority, application Japan, May 31, 1965, 40/32,348; June 22, 1965, 40/37,234; Dec. 20, 1965, 40/78,790, 40/78,792
Int. Cl. C07d *7/06*
U.S. Cl. 260—343.5 3 Claims

ABSTRACT OF THE DISCLOSURE

A process is provided for producing an optically active dihydrochrysanthemolactone represented by the following formula:

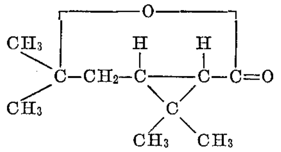

which is useful in the production of insecticides. The process comprises treating optically active 2,2-dimethyl-3-cis-(2'-oxo)propyl-cyclo-propyl-1-acetaldehyde in an aqueous alkaline or acid solution or acetic acid anhydride, or in an organic solvent with use of catalyst, at a temperature of 50° to 200° C., reacting the resulting optically active 2-acetyl-6,6-dimethyl-bicyclo[3,1,0]-2-hexene with ozone gas in an organic solvent at a temperature of —60° to 20° C., treating the resulting ozonide with hydrogen peroxide, periodic acid or its salt and treating the resulting cis-homocaronic acid in excess acetic acid anhydride at a temperature of 100° to 150° C. to form optically active cis-homocaronic acid anhydride and treating said anhydride with a Grignard reagent represented by the formula $CH_3MgX$ where X is halogen.

This invention relates to a process for producing an optically active dihydrochrysanthemolactone.

More specifically, this invention relates to a process for producing an optically active dihydrochrysanthemolactone represented by the following formula:

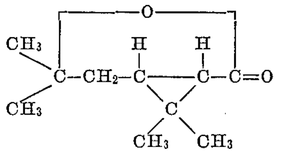

(I)

As is well known, chrysanthemic acid is an essential component of the natural and synthesized insecticides such as pyrethrin, cinerin, allethrin, cyclethrin or the like. From the stereostructural point of view, it has two kinds of isomers, namely, cis- and trans-isomers, each of which has in turn (+) and (—) optically active antipodes. It is also known that these four kinds of isomers respectively have a different roles in insecticidal effectiveness of the respective insecticidal compounds in which they are an acidic moiety.

The conventional methods for synthetically producing chrysanthemic acid have given a mixture of optically inactive cis- and trans-forms.

Accordingly, separation of the stereo-isomers and resolution of a desired optically active isomer, followed by racemization of the antipode isomer, had to be repeated to obtain an optically active chrysanthemic acid having high effectiveness.

A new process discovered by the present inventors gives selectively the optically active compound represented by the Formula I, when an optically active starting material is used.

While, the compound is easily converted to the corresponding optically active cis-chrysanthemic acid according to the method already disclosed in Journal of Science and Food Agriculture 3,233 (1952) by S. H. Harper and R. A. Thompson. Besides, the optically active cis-chrysanthemic acid thus-produced may be easily converted to the optically antipodal trans-acid which is the most valuable in the production of pyrethroidal insecticides, by the procedure which has been discovered by the present inventors.

Thus, an object of the present invention is to provide a process for producing an optically active compound represented by the Formula I with lower expenses and greater simplicity, compared with that of the prior process.

Other objects and advantages of the present invention will be apparent from the present description.

The present inventors have found that these objects are accomplished by provision of a process for producing an optically active dihydrochrysanthemolactone which comprises, as first step, converting optically active 2,2-dimethyl-3-cis-(2'-oxo) propyl-cyclopropyl-1-acetaldehyde represented by the formula of

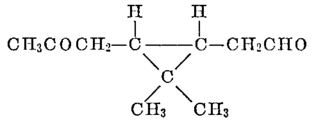

(II)

to novel optically active 2-acetyl-6,6-dimethyl-bicyclo-[3,1,0]-2-hexene represented by the formula of

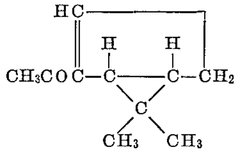

(III)

by intramolecular aldol condensation of the aldehyde represented by the Formula II by use of a catalyst, as 2nd step, converting the conjugated ketone represented by the Formula III to optically active cis-homocaronic acid represented by the formula of

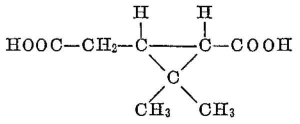

(IV)

by oxidation of the said conjugated ketone, as 3rd step, converting the cis-homocaronic acid to optically active cis-homocaronic acid anhydride represented by the formula of

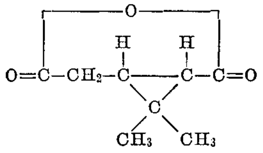

(V)

by intramolecular dehydration of the cis-homocaronic acid, and as the last step, converting the said cis-homocaronic acid anhydride to optically active dihydrochrysanthemolactone represented by the Formula I by contacting the said cis-homocaronic acid anhydride with a Grignard reagent, $CH_3MgX$, wherein X means a halogen atom.

A full understanding of the present invention can be given by referring to the following detailed illustration. The starting aldehyde material represented by the Formula II may be prepared from $\Delta_3$-carene through ozonization and subsequent reductive decomposition according to the well known procedure disclosed by F. W. Semmler and H. von Schiller in Ber. 60, 1591 (1927). If an optically active, namely (+) or (−), $\Delta_3$-carene is employed, the corresponding optically active aldehyde, II, can be obtained.

As to first step, the optically active aldehyde obtained from an optically active $\Delta_3$-carene is subjected to intramolecular aldol condensation reaction under an adequate condition, thereby to selectively obtain the conjugated ketone represented by the Formula III with high yield.

More specifically, the said aldehyde is dissolved usually in an excess amount of acetic acid anhydride. Now, it is not necessary to use a solvent in this reaction since an excess amount of acetic acid anhydride has function of a solvent by itself, but an organic solvent which is inert to the intramolecular aldol condensation reaction may be employed, in other words, an aromatic hydrocarbon such as benzene and toluene or a petroleum hydrocarbon such as petroleum benzin and n-hexane are exemplified as the usable solvent.

Successively, anhydrous sodium or potassium acetate is added to the said solution and the mixture is heated while being stirred.

The reaction is controlled at a temperature of from 50° to 200° C., usually from 100° to 150° C. After the reaction is over, the reaction mixture is cooled and filtered to remove a solid product or poured on crushed ice to dissolve the said product and then distilled to remove the employed reagent.

The residual oily product is subjected to distillation in vacuo to separate pure optically active 2-acetyl-6,6-dimethyl-bicyclo [3,1,0]-2-hexene.

Meanwhile, as another reagent for intramolecular aldol condensation, various kinds of acids which are strongly acidic in aqueous solution may be employed as an aqueous solution thereof, for example, a mineral acid such as sulfuric acid and hydrochloric acid or an organic sulfonic acid such as p-toluenesulfonic acid and methanesulfonic acid, and the like.

Besides, an alkali metal hydroxide such as sodium hydroxide, an alkali earth metal hydroxide such as barium hydroxide, an alkali metal carbonate such as sodium carbonate and sodium bicarbonate and an ammonium hydroxide such as methylammonium hydroxide and ammonium hydroxide, may be also employed as an aqueous solution thereof.

Moreover, a tertiary amine such as triethylamine and pyridine, and a quaternary ammonium hydroxide may be usable. The reagents mentioned above may be employed as a more valuable reagent from the industrial point of view so as to obtain the objective optically active product with high yield without any by-product.

In case of using these reagents, this reaction proceeds in the presence or absence of another solvent.

If desired, organic solvents which are inert to aldol condensation reaction may be employed, in other words, petroleum ether, diethyl ether, benzene, acetic acid, acetic acid anhydride and ethyl alcohol are exemplified as the usable solvent.

The reaction temperature depends on the reagent employed, usually from the freezing point thereof to 150° to 160° C. The reaction period of time is from several minutes to scores of hours.

After the reaction is over, the reaction mixture is subjected to such unit processes as extraction and distillation, thereby to isolate the pure objective product. As to 2nd step, it has been known, so far, that cis-homocaronic acid, especially optically active cis-homocaronic acid, is prepared from the optically active oxime represented by the following formula:

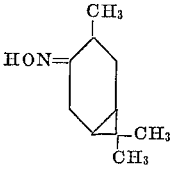

More specifically, the said oxime obtained from optically active $\Delta_3$-carene has been oxidized with potassium permanganate to obtain optically active cis-homocaronic acid.

However, it is also almost impossible for this process to produce optically active cis-homocaronic acid on an industrial scale, because of the exceedingly low yield and need of an expensive reagent such as isoamyl nitrite and potassium permanganate.

Thus, the present inventors have now found that by oxidation of the conjugated ketone represented by the Formula of III, optically active cis-homocaronic acid can be obtained even with advantage from the industrial point of view and with high yield.

A more detailed illustration is given hereinafter. If the step is effected by ozonization, the oxidation reaction may be theoretically illustrated in the two stages.

Namely, the conjugated ketone represented by the Formula III is ozonized in the first stage by use of ozone gas. As a matter of convenience, the following formula is given to the ozonide product, since there is not yet specified chemical structure for ozonide in general which has been broadly approved.

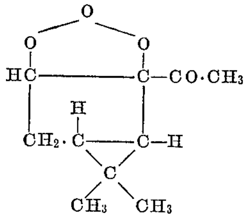

Then, the said ozonide is pyrolized to obtain an α-diketone represented by the formula of,

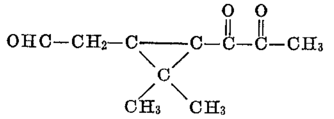

followed by oxidative cleavage, thereby to obtain cis-homocaronic acid represented by the Formula of IV.

It is preferable to carry out the ozonization in an organic solvent which is inert to the reaction. For example, a halogenated aliphatic hydrocarbon such as chloroform, methylene chloride and carbon tetrachloride, or glacial acetic acid, ethyl acetate and the like which are conventionally used in ozonization reaction. Ozonization reaction is preferably done at a relatively low temperature, namely from −60° to 20° C., taking into consideration stability of the resulting ozonide.

The resulting ozonide may be subjected to the next step without separation from the reaction mixture. In carrying out the oxydative cleavage of the α-diketone produced by pyrolysis of the said ozonide, or in carrying out, more preferably, the direct oxidative ring cleavage of the said ozonide, the most advantageously employed is hydrogen peroxide. Another reagent employable for the oxidative cleavage of the α-diketone is periodic acid or its salt.

Furthermore, cis-homocaronic acid may be produced directly from the conjugated ketone having the formula of III by use of potassium permanganate.

These oxidative reactions are effected satisfactorily in water solvent. If desired, however, water together with an organic solvent which is inert to this oxidation reaction, may be employed. The reaction is advantageously controlled within the temperature range of from 20° to 100° C.

As to 3rd step, so far, a trial for production of cis-homocaronic acid anhydride from cis-homocaronic acid by intramolecular dehydration thereof has been reported in the Arkiv. Kemi. 11 195 (1957) and Chem. Abs. 52 1108–h (1958) by G. Widmark.

More concretely, cis-homocaronic acid is heated in acetic acid anhydride at temperature of 210° C. to obtain the acid anhydride, followed by boiling in water to obtain 3,3-dimethyl-1-butene-1,4-dicarboxylic acid represented by the following formula:

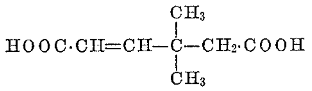

After the tracing experiment, however, the present inventors have found that the so-called cis-homocaronic acid anhydride thus obtained has a double bond conjugated to carbonyl radical as proved by infrared absorption spectrum at 1650 cm.$^{-1}$, therefore there is no doubt concerning the absence of cyclopropane ring in the said acid anhydride. In other words, it is impossible to produce cis-homocaronic acid anhydride according to the prior art, because of cyclopropane ring cleavage.

The present inventors have also found that cis-homocaronic acid anhydride having cyclopropane ring unaffected is obtained from cis-homocaronic acid by intramolecular dehydration thereof with exceedingly high yield under an adequate condition.

More concretely, cis-homocaronic acid is dissolved in an excess amount of acetic acid anhydride and the solution is kept at temperature of from 100° to 150° C., more preferably at about 140° C. Thereafter, the reaction mixture is subjected to the conventional separating procedure to obtain crystalline cis-homocaronic acid anhydride having M.P. 62° C.

The fact that the cis-homocaronic acid as obtained by the present inventors has no double bond is obvious from the infrared and ultraviolet absorption spectra. Besides, the chemical structure of the inventors' cis-homocaronic acid, particularly the presence of a cyclopropane ring with retention of the absolute configuration of the two asymmetric carbon atoms, is also certified by the fact that the latter yields well-established dihydrochrysanthemolactone according to the last step of the process according to the present invention, as mentioned hereinafter.

Reagents usually employed in the production of the carboxylic acid anhydride are those which may be conventionally employed for dehydrating reaction of carboxylic acid to its anhydride at a relatively mild temperature range.

Namely, lower aliphatic carboxylic acid anhydrides such as acetic acid anhydride and propionic acid anhydride, and lower aliphatic carboxylic acid chlorides such as acetyl chloride and propionyl chloride are exemplified. This reaction is controlled, in case of using a lower aliphatic carboxylic acid anhydride, at a temperature of from 100° to 150° C., meanwhile, when using a lower aliphatic carboxylic acid chloride, from 50° to 100° C.

As to the last step, it is known that a cyclic dicarboxylic acid anhydride is contacted with a Grignard reagent to obtain a $\gamma$- or $\delta$-lactone.

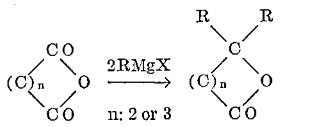

Accordingly, it may be anticipated that, when a symmetrical cyclic acid anhydride such as phthalic acid anhydride is contacted with a Grignard reagent, only one kind of lactone is produced as follows:

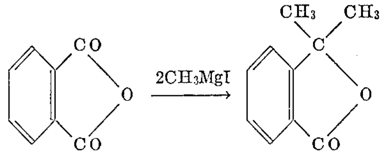

However, when a dicarboxylic acid anhydride having an asymmetrical molecular structure is treated as mentioned above, either of the two kinds of a lactone is produced as far as the probability goes.

It is, now, anticipated that, when cis-homocaronic acid anhydride is treated with methylmagnesium iodide, either of the two is produced as follows:

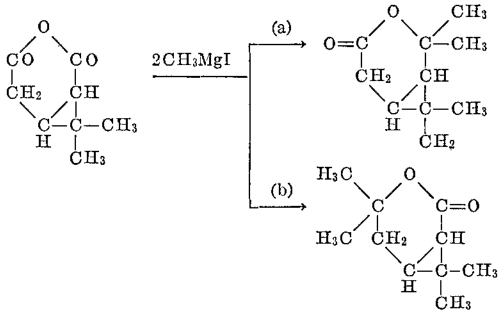

However, the reaction route (a) is usually known on the basis of an electronic theory according to which a more polarized carbonyl radical may be preferentially attacked with a Grignard reagent. While, the present inventors have found that, when optically active cis-homocaronic acid anhydride is attacked with a Grignard reagent to introduce two methyl radicals thereinto, an optically active dihydrochrysanthemolacetone represented by the Formula I is preferentially produced.

Through careful examination of the product, the inventors have also found that an extremely slight amount of pyrocin is by-produced which presumably results through the route (a) as described above. But its amount is negligible and it is obvious that the reaction proceeds predominantly through the route (b).

Moreover, the inventors have confirmed that (+) cis-homocaronic acid is converted to (−) dihydrochrysanthemolactone via the process according to the present invention, vice versa, (−) cis-homocaronic acid to (+) dihydrochrysanthemolactone and the present compounds represented by the Formulas I and III to V retain the absolute steric configuration of two asymmetric carbon atoms, namely $C_1$ and $C_3$ atoms in the cyclopropane ring, in due consideration of determination of the specific rotatory power to the present compounds.

More concretely, it is preferable to use an organic solvent which is usually employed in Grignard reaction.

For example, an aliphatic ether such as diethyl ether and dibutyl ether, an alicyclic ether such as tetrahydrofuran, 1,4-dioxane and 4-methyl-1,3-dioxane, a dialkylaniline such as N,N-dimethylaniline and N,N-diethylaniline, an aromatic hydrocarbon such as benzene and toluene, a petroleum hydrocarbon such as petroleum ether, n-hexane, petroleum benzine and cyclohexane or a mixture thereof is exemplified.

As the Grignard reagent, methylmagnesium iodide, methylmagnesium bromide and methylmagnesium chloride are exemplified.

The reaction is controlled usually at a temperature of −20° to 150° C.

The reaction period of time depends on the reaction temperature, for example, at a temperature of from 20° to 30° C., it takes about 10 minutes from the end of mixing the acid anhydride represented by the Formula V and a Grignard reagent to accomplish the leading reaction, on the other hand, in order to remove a heat of reaction from the reaction system, the reaction may be extended over so long time by dropping the reagent gradually.

After the reaction is over, the reaction mixture is poured into a diluted mineral acid or an aqueous solution of ammonium chloride to decompose the Grignard complex and successively acidified with a diluted mineral acid.

The acidic reaction mixture is subjected to extraction with ethyl ether or benzene and the resulting layer is treated with an aqueous solution of an alkali carbonate to remove a very small amount of pyrocin as a neutral product.

The layer of an aqueous alkali carbonate solution is acidified with a diluted mineral acid and successively subjected to extraction with ethyl ether or benzene to separate an oily product. The thus-obtained oily product is heated in the presence of a small amount of sulfuric acid, methanesulfonic acid or p-toluenesulfonic acid to obtain an optically active dihydrochrysanthemolactone, as a colorless crystaline product, with high yield.

An optically active dihydrochrysanthemolactone obtained according to the present invention may be converted to optically active chrysanthemic acid, particularly (—) dihydrochrysanthemolactone to (+)-transchrysanthemic acid which is the most valuable in the production of pyrethroidal insecticides.

It is needless to say that the process of the present invention should not be restricted to the reaction using the optically active compounds, but it includes the process for the production of optically inactive dihydrochrysanthemolactone from the optically inactive keto-aldehyde.

A more comprehensive understanding on the present invention can be obtained by referring to the following illustrative examples which are not intended, however, to unduly limit the invention.

EXAMPLE 1

Twenty grams of optically active (—) 2,2-dimethyl-3-cis-(2'-oxo) propyl-cyclopropyl - 1 - acetaldehyde obtained from (+) $\Delta_3$-carene is mixed with 60 cc. of acetic acid anhydride and 10 g. of anhydrous sodium acetate and the mixture is heated for 3 hours at temperature of 130° C., while being stirred.

After cooling the reaction mixture, 100 cc. of benzene is added thereto and the mixture is poured onto crushed ice.

Thereafter, benzene layer is separated and dried over anhydrous sodium sulfate. After removal of benzene and acetic acid anhydride by distillation, the residual oily product is subjected to the distillation in vacuo, thereby to separate 12 g. of (+) 2-acetyl-6,6-dimethylbicyclo-[3,1,0]-2-hexene having B.P. 40° C./0.5 mm. Hg, $n_D^{22}$ 1.4865, $[\alpha]_D^{14}$+252° ($CHCl_3$), $\lambda_{max.}$ 262 mμ (EeOH), $$\nu_{max.}^{film}$$

1675, 1603, 810 cm.$^{-1}$, N.M.R. chemical shift $\tau$ 9.15, 8.80, 8.55, 7.8–7.9, 7.65, 7.4, 3.3 p.p.m. ($CCl_4$) the semicarbenzone, M.P. 214° C. (decomposed).

*Elementary analysis.*—Calculated (as $C_{11}H_{17}N_3O$), percent: C, 63.74; H, 8.27; N, 20.27. Found (percent): C, 63.59; H, 7.92; N, 20.01.

EXAMPLE 2

Ten grams of optically active (—) 2,2-dimethyl-3-cis-(2'-oxo)propyl-cyclopropyl-1-acetaldehyde obtained from (+) $\Delta_3$-carene is mixed with 100 ml. of aqueous 10% sodium hydroxide solution and the mixture is vigorously stirred for 30 minutes at room temperature.

The reaction mixture is subjected to extraction with benzene and the benzene layer is washed with water and dried over anhydrous sodium sulfate.

After removal of benzene by distillation, the remaining residue is distilled, thereby to obtain 6.3 g. of (+) 2-acetyl-6-6-dimethyl-bicyclo[3,1,0]-2-hexene having B.P. 65° to 75° C./0.8 mm. Hg, $n_D^{26}$ 1.4845 and $$\nu_{max.}^{film}$$

1675, 1600, 800 cm.$^{-1}$.

*Elementary analysis.*—Calculated (as $C_{10}H_{14}O$), percent: C, 80.0; H, 9.34. Found (percent): C, 77.8; H, 8.96. The 2,4-dinitrophenylhydrazone M.P. 162°–163° C.

*Elementary analysis.*—Calculated (as $C_{16}H_{18}O_4N_4$), percent: C, 58.2; H, 5.99; N, 17.0. Found (percent): C, 58.3; H, 5.48; N, 16.6.

EXAMPLE 3

Ten grams of optically active (—) 2,2-dimethyl-3-cis-(2'-oxo)propyl-cyclopropyl-1-acetaldehyde is dissolved in 80 ml. of benzene and 20 ml. of ethyl alcohol and then 0.5 g. of p-toluenesulfonic acid as a catalyst is added thereto. The mixture is heated for 8 hours under reflux. After the reaction is over, 100 ml. of benzene is further added thereto and the reaction mixture is washed with water. Thereafter the benzene layer is dried over anhydrous sodium sulfate.

After removal of benzene by distillation, the resulting residue is distilled, thereby to separate 8.3 g. of (+) 2-acetyl-6,6-dimethyl-bicyclo[3,1,0]-2-hexene having B.P. 110°–112° C./33 mm. Hg.

*Elementary analysis.*—Calculated (as $C_{10}H_{14}O$), percent: C, 80.0; H, 9.34. Found (percent): C, 80.3; H, 9.03.

The melting point depression is not found in the mixed examination with that obtained in Example 2 on the 2,4-dinitrophenylhydrazone.

EXAMPLE 4

Ten grams of optically active (—) 2,2-dimethyl-3-cis-(2'-oxo)propyl-cyclopropyl-1-acetaldehyde is heated with 200 ml. of acetic acid anhydride for 6 hours at temperature of 140° C.

Thereafter, acetic acid anhydride and produced acetic acid are removed by distillation under diminished pressure and the residue is distilled in vacuo, thereby to separate 3,3 g. of (+) 2-acetyl-6,6-dimethyl-bicyclo [3,1,0]-2-hexene having B.P. 40° to 45° C./0.2 mm. Hg.

*Elementary analysis.*—Calculated (as $C_{10}H_{14}O$), percent: C, 80.0; H, 9.34. Found (percent): C, 79.0; H, 8.89.

The melting point depression is not found in the mixed examination with that obtained in Example 2 on the 2,4-dinitrophenylhydrazone.

EXAMPLE 5

Ten grams of optically active (—) 2,2-dimethyl-3-cis-(2'-oxo)propyl-cyclopropyl-1-acetaldehyde is dissolved in 100 ml. of benzene and successively 3 ml. of triethylamine as catalyst is added to the said mixture.

The mixture is heated for 2 hours under reflux.

After the reaction is over, the benzene layer is separated, washed with water and dried over anhydrous sodium sulfate. After removal of benzene by distillation, the resulting residue is distilled in vacuo, thereby to separate 5.7 g. of (+) 2-acetyl-6,6-dimethyl-bicyclo[3,1,0]-2-hexene having B.P. 50°–52° C./0.3 mm. Hg.

*Elementary analysis.*—Calculated (as $C_{10}H_{14}O$), percent: H, 80.0; C, 9.34. Found (percent): H, 81.5; C, 9.54.

EXAMPLE 6

Two grams of (+)2-acetyl-6,6-dimethyl-bicyclo[3,1,0]-2-hexene is dissolved in 50 ml. of glacial acetic acid and ozone gas is introduced into the said solution during the period of 2 hours at a temperature of from 0° to 5° C. while being cooled with ice water, then the reaction mixture shows yellowish green.

The resulting ozonide solution is dropped into 20 ml. of glacial acetic acid kept at temperature of 70° C. while being heated and stirred and the mixture is further stirred for 1 hour at the same level of temperature.

After the reaction is over, acetic acid is removed by distillation under diminished pressure. The residue is dissolved in 300 ml. of aqueous 1 N solution of sodium hydroxide and successively 200 ml. of aqueous 6% hydrogen peroxide is added thereto. The mixture is left as it is for 12 hours at room temperature.

The reaction mixture is acidified with an aqueous diluted hydrochloric acid and subjected to extraction with ethyl ether. The ethyl ether layer is washed with water and dried over anhydrous magnesium sulfate.

Removal of ethyl ether by distillation leaves 1.5 g. of crystalline (+) cis-homocaronic acid having M.P. 112°–113° C. $[\alpha]_D^{15}+68.6°$ (ethyl alcohol C=1.457).

*Elementary analysis.*—Calculated (as $C_8H_{12}O_4$), percent: C, 55.80; H, 7.03. Found (percent): C, 55.62; H, 6.95.

EXAMPLE 7

Ten grams of (+)2-acetyl-6,6-dimethyl-bicyclo[3,1,0]-2-hexene is dissolved in 100 ml. of chloroform. Thereafter, introduction of ozone gas into the said chloroform solution is continued at temperautre of −50° C. until the color of solution changes to blue. The blue chloroform solution is dropped into a solution consisting of 40 ml. of aqueous 30% hydrogen peroxide, 15 g. of sodium hydroxide and 160 ml. of water at a temperature of from 45° to 50° C. and the mixture is stirred for 30 minutes at the same level of temperature. Then the temperature is raised up to 80° to 90° C., kept at the same level for 2 hours to evaporate chloroform and thereafter, taken down to room temperature.

After removal of very small amount of the neutral part by extraction with ethyl ether, the residue is adjusted to less than pH2 with an aqueous dilute sulfuric acid and subjected to extraction with ethyl ether. The ethyl ether layer is dried over anhydrous magnesium sulfate.

Removal of ethyl ether by distillation leaves (+)cis-homocaronic acid in the state of oily product, which is crystallized after a while. M.P. 113° C. Yield: 6 g.

*Elementary analysis.*—Calculated as ($C_8H_{12}O_4$), percent: C, 55.80; H, 7.03. Found (percent): C, 55.94; H, 7.34.

EXAMPLE 8

One gram of (+) cis-homocaronic acid is dissolved in 5 ml. of acetic acid anhydride and the mixture is heated for 1 hour at temperature of 140° C. under reflux.

Removal of acetic acid anhydride and acetic acid leaves 0.88 g. of crystalline product. The recrystallized product from ligroin has a melting point of 62° C. Infrared absorption spectra $$\nu_{max.}^{film}$$

1800, 1755, 1275, 1170 cm.$^{-1}$.

*Elementary analysis.*—Calculated (as $C_8H_{10}O_3$), percent: C, 62.3; H, 6.50. Found (percent): C, 62.2; H, 6.60.

The thus-obtained product is confirmed to be optically active cis-homocaronic acid anhydride, since the said product may be converted to (−)dihydrochrysanthemolactone having M.P. 83° C. and specific rotatory power $[\alpha]_D^{23}-71.2°$ (chloroform), according to the following example.

EXAMPLE 9

Eight tenth gram of (+) cis-homocaronic acid anhydride is dropped into a diethyl ether solution containing methylmagnesium iodide prepared from 0.29 g. of magnesium, 2.0 g. of methyl iodide and 7 ml. of pure diethyl ether, during period of 5 minutes at temperature of 30° C. while being stirred. The mixture is further stirred for 30 minutes at the same level of temperature and 10 ml. of aqueous 20% ammonium chloride is added thereto, while being cooled. The mixture is stirred until a solid product almost disappears.

After separation of the ethyl ether layer, 5 ml. of aqueous 10% sulfuric acid is added to the residual water layer to separate an oily product, and ethyl ether is added thereto.

Successively, the mixture is alkalized by addition of aqueous 10% sodium carbonate and then ethyl ether layer is separated.

Removal of ethyl ether leaves 0.02 g. of an oily product, which is solidified after a while. The thus-obtained product is confirmed to be a crude pyrocin according to infrared absorption spectrum.

While, the aqueous layer is further acidified with aqueous 10% sulfuric acid and subjected to extraction with toluene. Five milligrams of p-toluenesulfonic acid is added to the isolated toluene layer and the mixture is boiled for 1 hour under reflux.

Being cooled, the toluene layer is washed with aqueous 5% sodium carbonate, successively with water and dried over anhydrous sodium sulfate.

Removal of toluene by distillation under diminished pressure leaves 0.5 g. of a light yellow oily product which is crystallized after a while. The recrystallized product from n-hexane, having M.P. 83° C. and specific rotatory power $[\alpha]_D^{27}-77°$, is confirmed to be (−) dihydrochrysanthemolactone because of identification to the authentic (−) dihydrochrysanthemolactone in the infrared absorption spectrum analysis and the mixed melting point examination.

What we claim is:

1. A process for preparing optically active dihydrochrysanthemolactone represented by the formula of

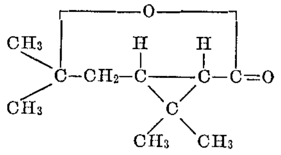

which comprises treating optically active 2,2-dimethyl-3-cis-(2′-oxo)propyl-cyclo-propyl-1 - acetaldehyde in an aqueous alkaline or acid solution or acetic acid anhydride, or in an organic solvent with use of catalyst, at a temperature of 50° to 200° C., reacting the resulting optically active 2-acetyl-6,6-dimethyl-bicyclo[3,1,0]-2-hexene with ozone gas in an organic solvent at a temperature of −60° to 20° C., treating the resulting ozonide with hydrogen peroxide, periodic acid or its salt and treating the resulting cis-homocaronic acid in excess acetic acid anhydride at a temperature of 100° to 150° C. to form optically active cis-homocaronic acid anhydride and treating said anhydride with a Grignard reagent represented by the formula $CH_3MgX$ where X is halogen.

2. A process for preparing optically active dihydrochrysanthemolactone represented by the formula

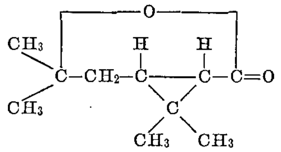

which comprises reacting optically active 2-acetyl-6,6-dimethyl-bicyclo[3,1,0]-2-hexene with ozone gas in an organic solvent at a temperature of −60° to 20° C., treating the resulting ozonide with hydrogen peroxide, periodic acid or its salt and treating the resulting cis-homocaronic acid in excess acetic acid anhydride at a temperature of 100° to 150° C. to form optically active cis-homocaronic acid anhydride and treating said anhydride with a Grignard reagent represented by the formula $CH_3MgX$ where X is halogen.

3. A process for preparing optically active dihydrochrysanthemolactone represented by the formula

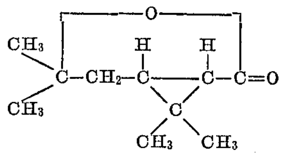

which comprises treating optically active cis-homocaronic acid in excess acetic acid anhydride at a temperature of 100° to 150° C. to form optically active cis-homocaronic acid anhydride and treating said anhydride with a Grignard reagent represented by the formula $CH_3MgX$ where X is halogen.

References Cited

FOREIGN PATENTS 893,321 8/1957 Great Britain ______ 260—343.5
893,322 8/1957 Great Britain ______ 260—343.6

ALTON D. ROLLINS, Primary Examiner
A. M. T. TIGHE, Assistant Examiner

U.S. Cl. X.R.

260—339, 343.6, 514, 537, 546, 566, 586